US012679764B2

(12) United States Patent
Mukasa et al.

(10) Patent No.:     US 12,679,764 B2
(45) Date of Patent:       Jul. 14, 2026

(54) OPTICAL FIBER

(71) Applicant: FURUKAWA ELECTRIC CO., LTD., Tokyo (JP)

(72) Inventors: Kazunori Mukasa, Tokyo (JP); Keiichi Aiso, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 272 days.

(21) Appl. No.: 18/538,487

(22) Filed: Dec. 13, 2023

(65) Prior Publication Data

US 2024/0150227 A1     May 9, 2024

Related U.S. Application Data

(63) Continuation of application No. PCT/JP2022/023462, filed on Jun. 10, 2022.

(30) Foreign Application Priority Data

Jun. 14, 2021     (JP) ................................. 2021-098926

(51) Int. Cl.
*C03C 13/04*          (2006.01)
*G02B 6/02*          (2006.01)
*G02B 6/028*          (2006.01)

(52) U.S. Cl.
CPC ........ *C03C 13/046* (2013.01); *G02B 6/02395* (2013.01); *G02B 6/0283* (2013.01); *C03C 2201/11* (2013.01); *C03C 2201/50* (2013.01)

(58) Field of Classification Search
CPC ........................... G02B 6/02395; C03C 13/046
See application file for complete search history.

(56) References Cited

U.S. PATENT DOCUMENTS

| | | | |
|---|---|---|---|
| 7,088,900 B1 | 8/2006 | Mishra | |
| 9,512,033 B2 | 12/2016 | Hirano et al. | |
| 10,422,946 B2 | 9/2019 | Nakanishi et al. | |
| 2005/0063663 A1 | 3/2005 | Anderson et al. | |

(Continued)

FOREIGN PATENT DOCUMENTS

| | | | |
|---|---|---|---|
| EP | 2 952 490 A1 | 12/2015 | |
| JP | 63-40744 A | 2/1988 | |

(Continued)

OTHER PUBLICATIONS

Extended European Search Report issued on May 13, 2025 in European Patent Application No. 22824927.2, 9 pages.

(Continued)

*Primary Examiner* — Chad H Smith
(74) *Attorney, Agent, or Firm* — Oblon, McClelland, Maier & Neustadt, L.L.P.

(57)          ABSTRACT

An optical fiber includes a core portion made of silica-based glass; and a cladding portion made of silica-based glass having lower maximum refractive index than the core portion, the cladding portion surrounding an outer periphery of the core portion. The core portion is doped with an alkali metal element and chlorine. An average concentration of chlorine is higher than 800 atomic ppm on a cross-section perpendicular to a longitudinal direction of the core portion. A region doped with the alkali metal element is larger than a region doped with chlorine at 800 atomic ppm or higher.

17 Claims, 5 Drawing Sheets

(56)  References Cited

U.S. PATENT DOCUMENTS

| | | |
|---|---|---|
| 2007/0297735 A1 | 12/2007 | Khrapko et al. |
| 2012/0263427 A1 | 10/2012 | Hirano et al. |
| 2013/0188917 A1 | 7/2013 | Hirano et al. |
| 2015/0226914 A1* | 8/2015 | Hirano ............... G02B 6/02266 |
| | | 385/127 |
| 2015/0285992 A1 | 10/2015 | Hirano et al. |
| 2015/0316712 A1 | 11/2015 | Anderson et al. |
| 2015/0370008 A1 | 12/2015 | Tamura et al. |
| 2016/0214886 A1 | 7/2016 | Hirano et al. |
| 2017/0022094 A1 | 1/2017 | Yan et al. |
| 2017/0108642 A1 | 4/2017 | Tamura et al. |
| 2017/0261685 A1 | 9/2017 | Nakanishi et al. |
| 2018/0251397 A1 | 9/2018 | Yan et al. |
| 2018/0299613 A1 | 10/2018 | Nakanishi et al. |
| 2019/0324195 A1 | 10/2019 | Sakuma et al. |
| 2020/0024182 A1 | 1/2020 | Sakuma et al. |
| 2020/0241198 A1 | 7/2020 | Sakuma et al. |
| 2020/0249393 A1 | 8/2020 | Sakuma et al. |

FOREIGN PATENT DOCUMENTS

| | | | |
|---|---|---|---|
| JP | 2007-504080 | A | 3/2007 |
| JP | 2008-536190 | A | 9/2008 |
| JP | 2009-541796 | A | 11/2009 |
| JP | 2012-229150 | A | 11/2012 |
| JP | 5489713 | B2 | 5/2014 |
| JP | 2015-105199 | A | 6/2015 |
| JP | 5974488 | B2 | 8/2016 |
| JP | 2017-27050 | A | 2/2017 |
| JP | 2017-76053 | A | 4/2017 |
| JP | 2017-161705 | A | 9/2017 |
| JP | 2019-191297 | A | 10/2019 |
| JP | 2020-12933 | A | 1/2020 |
| WO | WO 2007/149344 | A1 | 12/2007 |

OTHER PUBLICATIONS

International Search Report issued Jul. 19, 2022 in PCT/JP2022/023462 filed on Jun. 10, 2022, 2 pages.

* cited by examiner

OPTICAL FIBER

This application is a continuation of International Application No. PCT/JP2022/023462, filed on Jun. 10, 2022 which claims the benefit of priority of the prior Japanese Patent Application No. 2021-098926, filed on Jun. 14, 2021, the entire contents of which are incorporated herein by reference.

BACKGROUND

The present disclosure relates to an optical fiber.

A technique of changing characteristics, such as viscosity, of glass of a core region by doping the core region with an alkali metal element, chlorine, and fluorine to reduce transmission losses of an optical fiber made of silica based glass has been disclosed (see JP-A-63-40744, JP-T-2007-504080, JP-T-2008-536190, JP-T-2009-541796, JP-A-2012-229150 and JP-A-2015-105199).

SUMMARY

It has been known that if an alkali metal element and chlorine are co-doped into silica based glass, there is a case in which an alkali metal element and chlorine react to cause crystallization. Such crystallization may, for example, result in formation of air bubbles in the core region, to reduce the yield of the optical fiber.

In JP-A-2015-105199, the concentration of chlorine is relatively low, and in JP-T-2009-541796 and JP-A-2012-229150, three kinds of dopants including fluorine, chlorine, and an alkali metal element are doped into the core portion, but there has been room for improvement for these techniques.

There is a need for an optical fiber in which transmission losses are reduced simply and effectively while the yield is improved.

According to one aspect of the present disclosure, there is provided an optical fiber including: a core portion made of silica-based glass; and a cladding portion made of silica-based glass having maximum refractive index lower than the core portion, the cladding portion surrounding an outer periphery of the core portion, wherein the core portion is doped with an alkali metal element and chlorine, an average concentration of the chlorine is higher than 800 atomic ppm on a cross-section of the core portion perpendicular to a longitudinal direction, and a region doped with the alkali metal element is larger than a region doped with the chlorine at 800 atomic ppm or higher.

DETAILED DESCRIPTION

Hereinafter, an embodiment of the present disclosure will be explained in detail with reference to the drawings. The embodiment explained below is not intended to limit the present disclosure. Moreover, identical reference symbols are assigned to identical or corresponding components in the respective drawings. Furthermore, in the present application, cutoff wavelength or effective cutoff wavelength refers to cable cutoff wavelength ($\lambda$cc) defined in ITU-T G.650.1 of the International Telecommunication Union (ITU). Moreover, for terms not specifically defined in the present specification, definitions and measurement methods in G.650.1 and G.650.2 will be applied.

Figure 1:
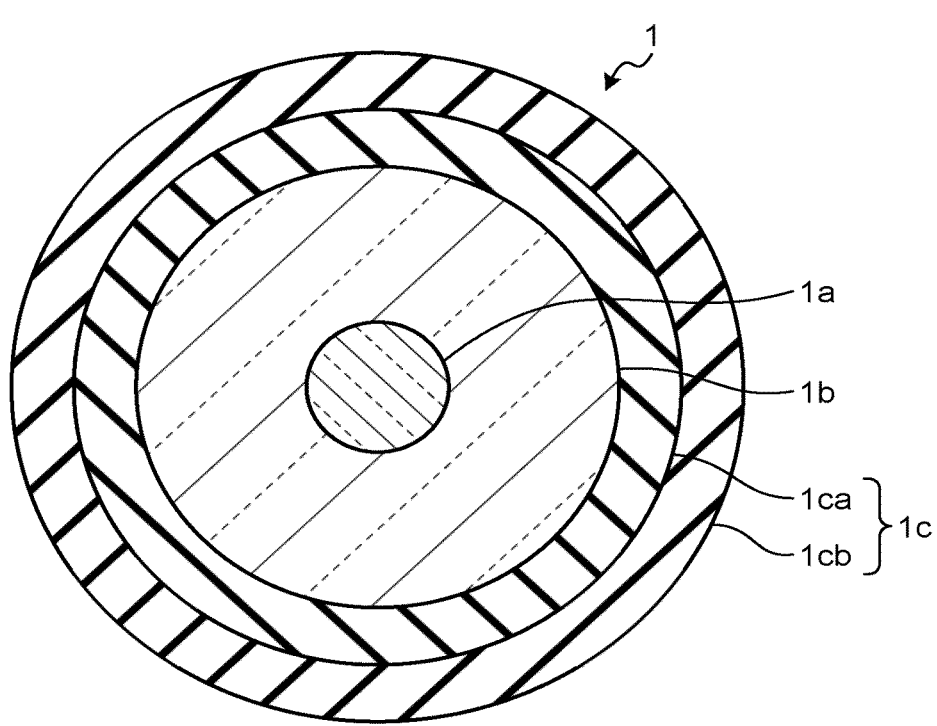
FIG. 1 is a schematic cross-section of an optical fiber according to an embodiment cut along a plane perpendicular to a longitudinal direction thereof.

FIG. 1 is a schematic cross-section of an optical fiber according to the embodiment cut along a plane perpendicular to a longitudinal direction thereof. An optical fiber 1 is made of a silica based glass, and includes a core portion 1a and a cladding portion 1b that surrounds an outer periphery of the core portion 1a. Note that a portion that includes the core portion 1a and the cladding portion 1b in the optical fiber 1 is a portion made of glass in the optical fiber, and may be denoted as glass optical fiber. Moreover, the optical fiber 1 includes a coating layer 1c that surrounds an outer periphery of the cladding portion 1b. The coating layer 1c includes a primary layer 1ca that surrounds the outer periphery of the cladding portion 1b, and a secondary layer 1cb that surrounds an outer periphery of the primary layer 1ca. The optical fiber including the coating layer 1c may be denoted as optical fiber core wire.

The optical fiber 1 has a refractive index profile, for example, as illustrated in FIG. 2A, 2B, 2C or 2D. FIGS. 2A, 2B, 2C, and 2D all show a refractive index profile in a radius direction from a center axis of the core portion 1a of the optical fiber 1. The refractive index profile is indicated by a relative refractive-index difference with respect to pure silica glass. Pure silica glass is silica glass with significantly high purity that includes substantially no dopants changing the refractive index, and the refractive index of which at a wavelength of 1550 nm is approximately 1.444.

Figure 2A:
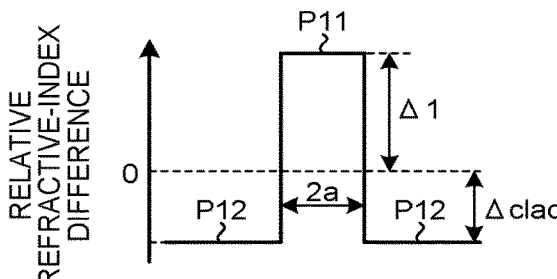
FIG. 2A is a schematic diagram of a refractive index profile of the optical fiber according to the embodiment.

FIG. 2A shows a step-index type refractive index profile. In FIG. 2A, a profile P11 indicates a refractive index profile of the core portion 1a, and a profile P12 indicates a refractive index profile of the cladding portion 1b. In the step-index type refractive index profile, a diameter (core diameter) of the core portion 1a is 2a, and a relative refractive-index difference of the maximum refractive index (maximum relative refractive-index difference) of the core portion 1a with respect to a refractive index of pure silica glass is $\Delta 1$. Moreover, a relative refractive-index difference of an average refractive index of the cladding portion 1b with respect to the refractive index of pure silica glass is $\Delta$clad. In the case of FIG. 2A, a center core that is a portion at which the average refractive index is maximized in the core portion 1a corresponds to the entire core portion 1a.

Figure 2B:
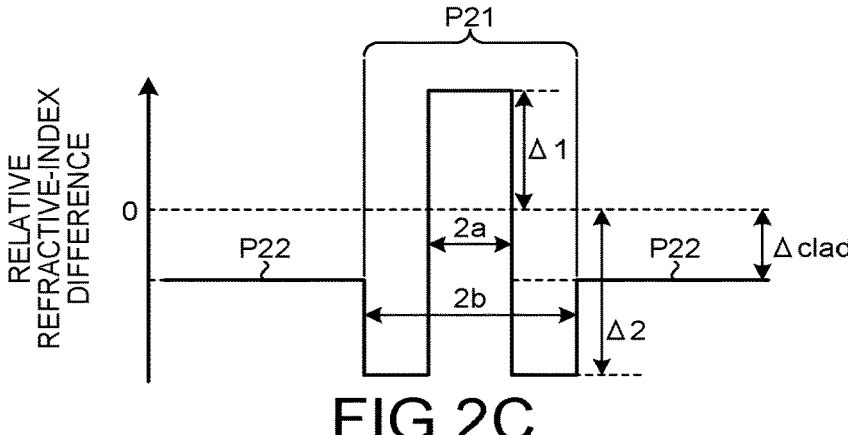
FIG. 2B is a schematic diagram of a refractive index profile of the optical fiber according to the embodiment.

FIG. 2B shows a so-called W-shaped type refractive index profile. In FIG. 2B, a profile P21 indicates a refractive index profile of the core portion 1$a$, and a profile P22 indicates a refractive index profile of the cladding portion 1$b$. In the W-shaped type refractive index profile, the core portion 1$a$ is constituted of a center core having a diameter 2$a$, and a depressed layer that is formed to surround an outer periphery of the center core, that has a refractive index smaller than the refractive index of the cladding portion, and in which an inner diameter is 2$a$ and an outer diameter is 2$b$. The center core is a portion in which the average refractive index is maximized in the core portion 1$a$. The maximum relative refractive-index difference of the center core with respect to the refractive index of pure silica glass is Δ1. The relative refractive-index difference of the average refractive index of the depressed layer with respect to the refractive index of pure silica glass is Δ2. Moreover, the refractive-index difference of the average refractive index of the cladding portion 1$b$ with respect to the refractive index of pure silica glass is Δclad.

Figure 2C:
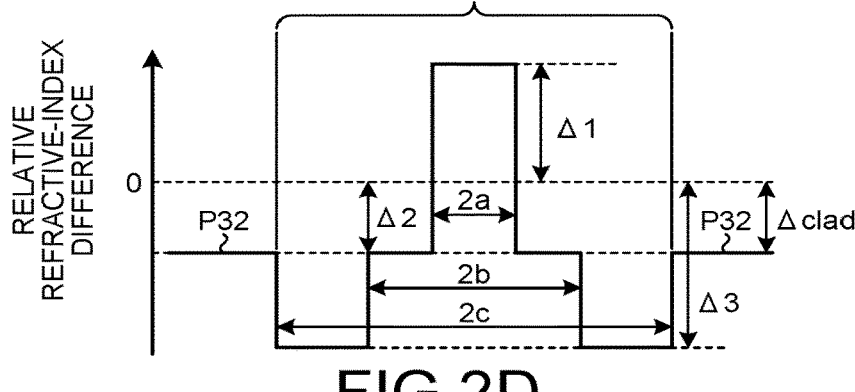
FIG. 2C is a schematic diagram of a refractive index profile of the optical fiber according to the embodiment.

FIG. 2C shows a so-called trench type refractive index profile. In FIG. 2C, a profile P31 indicates a refractive index profile of the core portion 1$a$, and a profile P32 indicates a refractive index profile of the cladding portion 1$b$. In the trench type refractive index profile, the core portion 1$a$ is constituted of a center core having a diameter 2$a$, an intermediate layer that is formed to surround an outer periphery of the center core, that has a refractive index smaller than the maximum refractive index of the center core, and in which an inner diameter is 2$a$ and an outer diameter is 2$b$, and a trench layer that is formed to surround an outer periphery of the intermediate layer, and that has a refractive index smaller than the refractive index of the cladding portion, and in which an inner diameter is 2$b$ and an outer diameter is 2$c$. The center core is a portion in which the average refractive index is maximized in the core portion 1$a$. The maximum relative refractive-index difference of the center core with respect to the refractive index of pure silica glass is Δ1. The relative refractive-index difference of the intermediate layer with respect to the refractive index of pure silica glass is Δ2. The relative refractive-index difference of the trench layer with respect to the refractive index of pure silica glass is Δ3. Moreover, the relative refractive-index difference of the average refractive index of the cladding portion 1$b$ with respect to the refractive index of pure silica glass is Δclad. Note that Δ2 is normally set to the same value as Δclad or its vicinity.

Figure 2D:
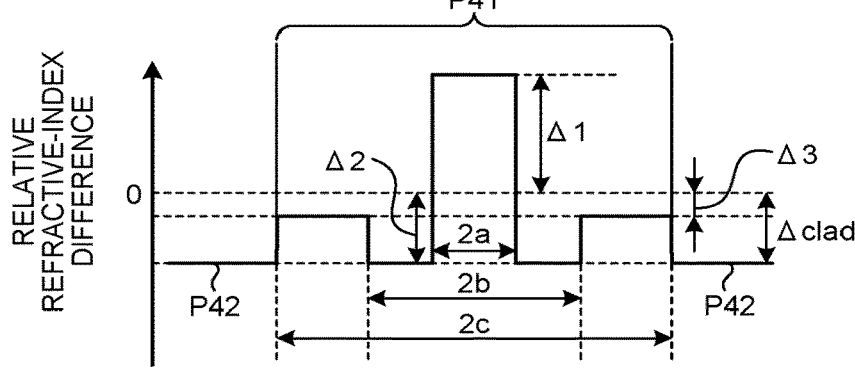
FIG. 2D is a schematic diagram of a refractive index profile of the optical fiber according to the embodiment.

FIG. 2D shows a so-called segment-core type refractive index profile. In FIG. 2D, a profile P41 indicates a refractive index profile of the core portion 1$a$, and a profile P42 indicates a refractive index profile of the cladding portion 1$b$. In the segment-core type refractive index profile, the core portion 1$a$ is constituted of a center core having a diameter 2$a$, an intermediate layer that is formed to surround an outer periphery of the center core, that has a refractive index smaller than the maximum refractive index of the center core, and in which an inner diameter is 2$a$ and an outer diameter is 2$b$, and a segment layer that is formed to surround an outer periphery of the intermediate layer, and that has a refractive index larger than the refractive index of the cladding portion, and in which an inner diameter is 2$b$ and an outer diameter is 2$c$. The center core is a portion in which the average refractive index is maximized in the core portion 1$a$. The maximum relative refractive-index difference of the center core with respect to the refractive index of pure silica glass is Δ1. The relative refractive-index difference of the intermediate layer with respect to the refractive index of pure silica glass is Δ2. The relative refractive-index difference of the segment layer with respect to the refractive index of pure silica glass is Δ3. Moreover, the relative refractive-index difference of the average refractive index of the cladding portion 1$b$ with respect to the refractive index of pure silica glass is Δclad. Note that Δ2 is normally set to the same value as Δclad or its vicinity.

The refractive index profile of the center core of the core portion 1$a$ is not only a geometrically ideal shape of step index, but may also be a shape in which a shape of a top portion is not flat but has unevenness due to manufacturing characteristics, or in a sloping shape tapering downward from the top like a hem. In this case, the refractive index of a region that is substantially flat at the top portion of the refractive index profile within a range of the core diameter 2$a$ of the core portion 1$a$ based on the manufacturing design is to be an index to determine Δ1. Also in a case in which a substantially flat region seems to be separated into plural parts, or in a case in which the definition of substantially flat region is difficult because continuous changes occur, it has been confirmed that characteristics close to those desired may be achieved as long as at least either part of the core portion excluding portions in which the refractive index changes abruptly toward an adjacent layer is within the range of Δ1 described below, and a difference of Δ between the maximum value and the minimum value is within a value ±30%, and there are no particular problems.

Furthermore, the average refractive index of the depressed layer, the intermediate layer, the trench layer, the segment layer, and the cladding portion 1$b$ is an average value of the refractive index in the diameter direction of the refractive index profile.

Constituent materials of the optical fiber 1 will be explained. The center core and the segment layer of the core portion 1$a$ are constituted of silica glass that includes chlorine (Cl) and an alkali metal element. The alkali metal element is, for example, potassium (K) and sodium (Na). Cl and an alkali metal element are dopants that increase the refractive index and that reduce viscosity of silica glass. Note that the alkali metal element may be doped as a compound such as potassium compound and sodium compound.

On the other hand, as for the cladding portion 1$b$, at least a part thereof is made of silica glass that includes, for example, fluorine or boron (B), which is a dopant to reduce the refractive index. On the other hand, the depressed layer and the trench layer are made of silica glass that includes more fluorine or boron, which is a dopant to reduce the refractive index, than in the cladding portion. The intermediate layer is made of silica glass of the same components as the cladding portion 1$b$ or components similar thereto. As the dopant to reduce the refractive index, it is more preferable to use fluorine in terms of manufacturability. Fluorine may be doped as fluorine compound.

It is preferable that a refractive-index reducing dopant be doped into a region of the cladding portion 1$b$ adjacent to the core portion 1$a$. Thus, the core portion 1$a$ and the cladding portion 1$b$ may produce a refractive index difference.

The primary layer 1$ca$ and the secondary layer 1$cb$ are made of resin. This resin is, for example, ultraviolet-curable resin. The ultraviolet-curable resin is a mixture of various kinds of resin materials, such as oligomer, diluent monomer, photopolymerization initiator, silane coupling agent, sensitizer, and lubricant, and an additive. As oligomer, conventionally known materials, such as polyether-based urethane acrylate, epoxy acrylate, polyester acrylate, and silicone acrylate may be used. As diluent monomer, conventionally known materials, such as monofunctional monomer and multifunctional monomer, may be used. Moreover, the addi-

5 | 6 tive is not limited to the ones described above, but a conventionally known additive and the like used for ultra-violet curable resin or the like may be used.

In the optical fiber 1, on a cross-section perpendicular to a longitudinal direction of the core portion 1a, an average chlorine concentration is higher than 800 atomic ppm, and a region doped with an alkali metal element is larger than a region doped with chlorine at 800 atomic ppm or higher.

Chlorine has an effect of reducing viscosity of silica glass, and is easier to handle in terms of controlling diffusion in silica glass compared to an alkali metal element. Therefore, by making the average concentration of chlorine higher than 800 atomic ppm on the cross-section perpendicular to the longitudinal direction of the core portion 1a, the viscosity of the core portion 1a is reduced, to reduce the transmission loss easily and effectively.

On the other hand, although an alkali metal element also has an effect of reducing viscosity of silica glass, if it is doped together with chlorine, crystallization may occur. However, the inventors of the present disclosure found through diligent study that by making the region doped with an alkali metal element larger than the region doped with chlorine at 800 atomic ppm or higher on the cross-section perpendicular to the longitudinal direction of the core portion 1a, crystallization may be suppressed and the yield may be improved.

As described, with the region doped with an alkali metal element arranged to be larger than the region in which the average concentration of chlorine is 800 atomic ppm or higher and that is doped with chlorine at 800 atomic ppm or higher on the cross-section perpendicular to the longitudinal direction of the core portion 1a, the optical fiber 1 for which the transmission loss is reduced easily and effectively and the yield is improved may be realized. The transmission loss of the optical fiber 1 is, for example, equal to or lower than 0.185 dB/km at a wavelength of 1550 nm.

Table 1 shows a relationship between a ratio of a diameter of a substantially circular region doped with K (K-doped region) to a diameter of a substantially circular region doped with chlorine at 800 atomic ppm or higher (chlorine high-concentration region) on the cross-section perpendicular to the longitudinal direction of the core portion 1a when the alkali metal element is K and a crystallization occurrence probability in an optical fiber with different average chlorine concentrations. The crystallization occurrence probability represents a rate of optical fibers in which visually recognizable air bubbles originated from occurrence of crystallization are formed throughout an entire length of preform out of manufactured optical fibers. Moreover, the average chlorine concentration represents an average chlorine concentration in a diameter direction in a region dope with chlorine at 0.1 atomic ppm or higher. Moreover, the average concentration of K in Table 1 is 50 atomic ppm. The average concentration of K represents an average concentration of K in a diameter direction of a region intentionally doped with K. As for a dopant to silica glass including K, it may be regarded that it has been intentionally doped when it is at a concentration of 0.1 atomic ppm or higher. Accordingly, the region doped with an alkali metal element may be regarded, for example, as a region in which an alkali metal element is present at a concentration of 0.1 atomic ppm or higher.

As is obvious from Table 1, when the region doped with K is larger than the region doped with chlorine at 800 atomic ppm or higher (approximately 472 weight ppm or higher), that is when the ratio of diameter is larger than 1.0, the crystallization occurrence probability becomes relatively small even if the average chlorine concentration is high as 800 atomic ppm or higher, and crystallization may be suppressed. Moreover, as is obvious from Table 1, it is preferable that the average chlorine concentration is lower than 3000 atomic ppm to suppress crystallization.

TABLE 1

| Ratio of K (K-Doped Region/Chlorine High-Concentration Region) | | 0.4 | 0.6 | 0.8 | 1.0 | 1.2 | 1.4 | 1.6 |
|---|---|---|---|---|---|---|---|---|
| Average Chlorine Concentration | 850 Atomic ppm | 71% | 59% | 44% | 31% | 17% | 9% | 5% |
| | 1,500 Atomic ppm | 83% | 64% | 49% | 37% | 20% | 12% | 7% |
| | 2,000 Atomic ppm | 91% | 78% | 57% | 43% | 24% | 17% | 9% |
| | 3,000 Atomic ppm | 97% | 88% | 79% | 61% | 50% | 39% | 21% |

Furthermore, the inventors of the present disclosure found through diligent study including numerous experiments that if at least one of peaks of concentration of an alkali element is positioned at a different position from a peak of concentration of chlorine, that is, when at least one peak of concentration of the alkali element is positionally shifted from the peak of concentration of chlorine, the crystallization occurrence probability may be further suppressed to be low even if chlorine is at a high concentration, for example, at a high concentration as 800 atomic ppm or higher.

Figure 3:
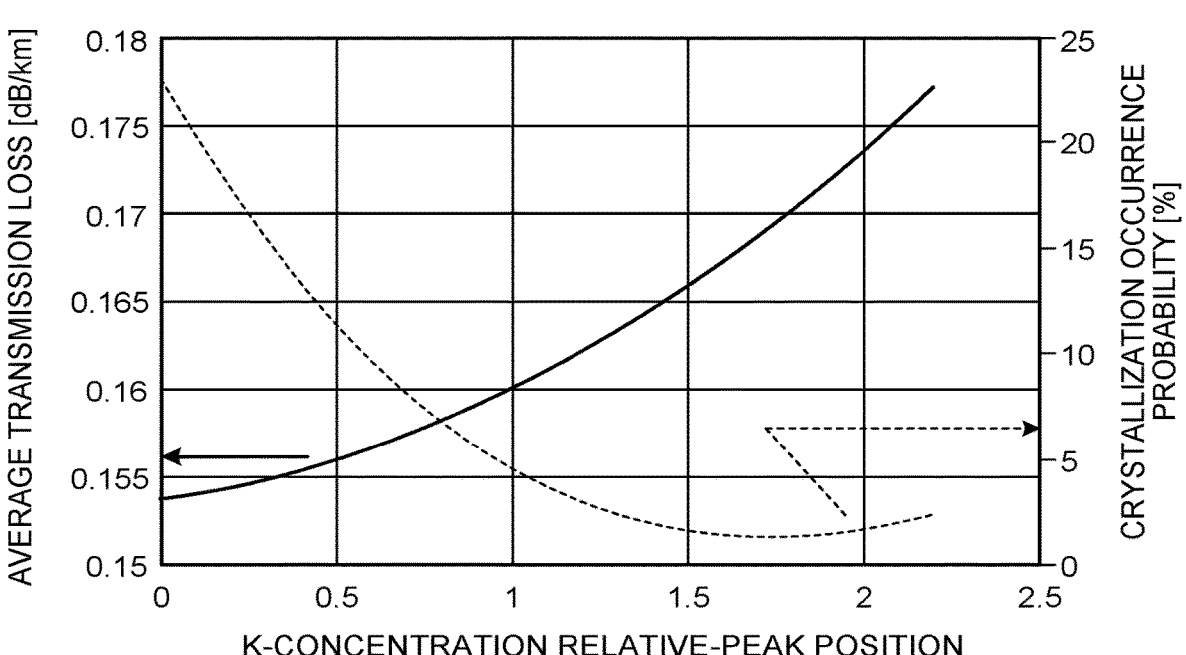
FIG. 3 is a diagram illustrating an example of a relationship among a K-concentration relative-peak position, an average transmission loss, and a crystallization occurrence probability.

FIG. 3 is a diagram illustrating an example of a relationship among a K-concentration relative-peak position, an average transmission loss, and a crystallization occurrence probability. The K-concentration relative-peak position is a position expressing a peak position of the K concentration in the diameter direction in the core portion 1a by normalizing with 1 representing a position at which the chlorine concentration becomes 800 atomic ppm in the core portion 1a. Although the peak of the chlorine concentration is positioned at the center of the core portion 1a in FIG. 3, it may be positioned at a vicinity of the center, or may be at other positions. The vicinity of the center of the core portion 1a is, for example, a position within 2 µm from the center. Moreover, the average transmission loss is an average transmission loss in plural optical fibers in which crystallization has not occurred, and is a value at a wavelength of 1550 nm. Furthermore, in FIG. 3, the average chlorine concentration is approximately 1800 atomic ppm, the average K concentration is approximately 50 atomic ppm, and a ratio of diameter (K-doped region/chlorine high-concentration region) is 1.2.

As illustrated in FIG. 3, by shifting the peak position of K concentration in the diameter direction from the center (K-concentration relative-peak position=0), the crystallization occurrence probability may be suppressed. On the other hand, it was found that if the peak position of K concentration is shifted from the center, the average transmission loss gradually increases. This is considered to be caused because the effect of reducing the transmission loss obtained by co-doping chlorine and K is degraded as the peak position of K concentration is shifted from the center. Particularly, because the average transmission loss starts to increase sharply around the K-concentration relative-peak position exceeding 2.0, it is preferable that the K-concentration relative-peak position be 2.0 or lower from the viewpoint of low transmission loss.

In the optical fiber of the embodiment, a peak of chlorine concentration may be absent at the center, but it was found that in that case also, by shifting the peak position of chlorine concentration from the peak position of K concentration, a similar effect may be obtained. Therefore, the peak position of K concentration may be at the center of the core portion 1a, and the peak position of the chlorine concentration may be at a position other than the center. In this case also, it is preferable that the region doped with an alkali metal element be larger than the region in which the average concentration of chlorine is 800 atomic ppm or higher, and that is doped with chlorine at 800 atomic ppm or higher. Moreover, it is preferable that the concentration of K having relatively low controllability compared to chlorine be reduced to be relatively low as chlorine having high controllability in concentration and distribution is doped at higher than 800 atomic ppm.

Furthermore, the inventors of the present disclosure manufactured an optical fiber in which chlorine and K are co-doped into the core portion 1a to prevent occurrence of crystallization, and conducted comprehensive and systematic experiments to reduce transmission loss.

Figure 4:
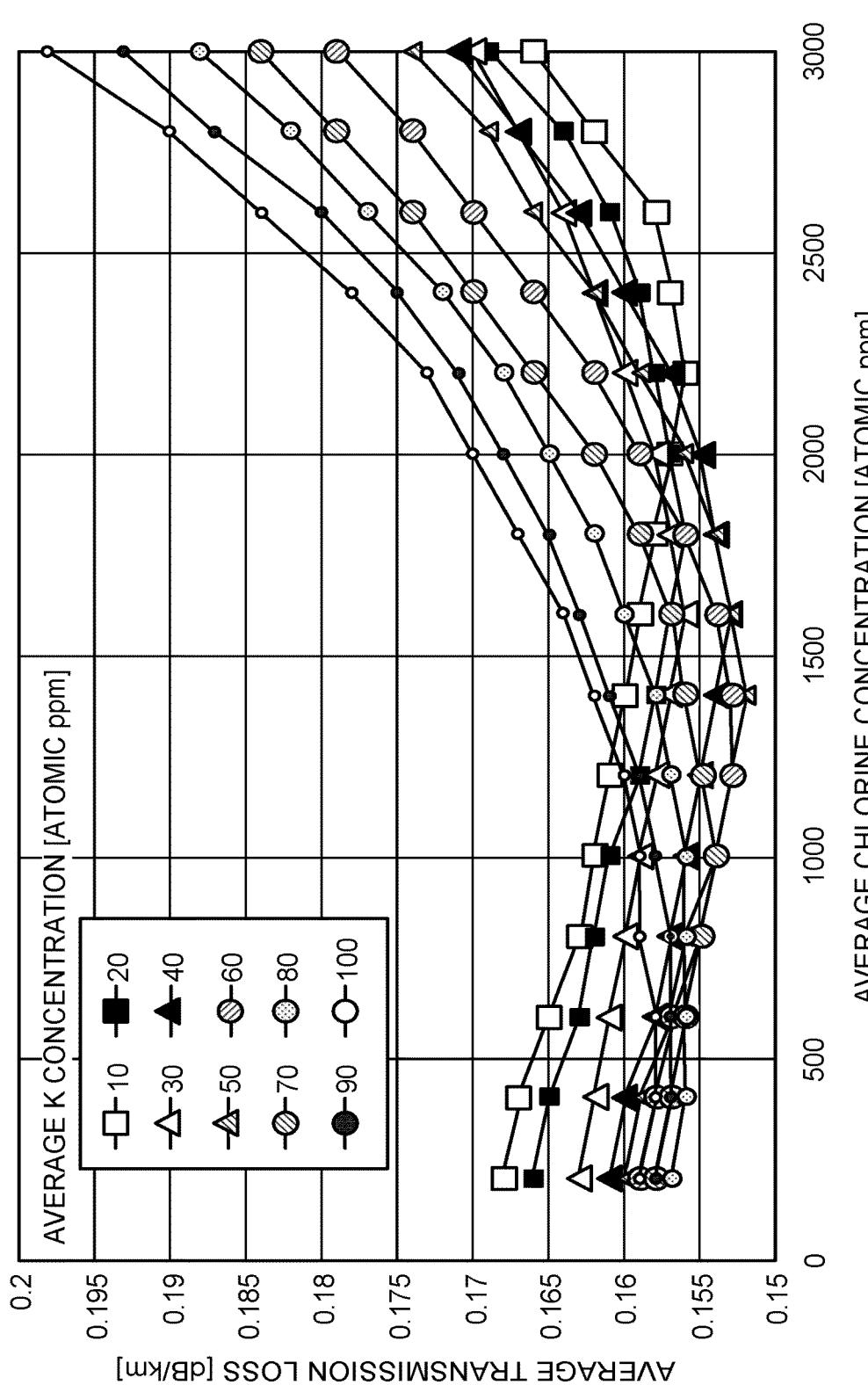
FIG. 4 is a diagram illustrating an example of a relationship between an average chlorine concentration and an average transmission loss.

FIG. 4 is a diagram illustrating an example of a relationship between an average chlorine concentration and an average transmission loss. The average K concentration was varied between 10 atomic ppm to 100 atomic ppm. As can also be seen from FIG. 4, because chlorine is doped at 800 atomic ppm or higher, the transmission loss may be effectively reduced. This is believed to be due to reduction in viscosity of the core portion 1a and also reduction in fictive temperature because chlorine is doped at high concentration. Moreover, the average chlorine concentration is preferable to be equal to or higher than 900 atomic ppm, and is more preferable to be equal to or higher than 1000 atomic ppm. However, because suppression of crystallization becomes difficult and it becomes more prone to be affected an influence of concentration fluctuation of chlorine and K if the chlorine concentration becomes too high, it becomes difficult to consistently achieve a transmission loss of 0.185 dB/km or lower at the wavelength of 1550 nm. From this viewpoint, the average chlorine concentration is preferable to be lower than, for example, 3000 atomic ppm.

As for the average K concentration, from the viewpoint of effectively achieving low transmission loss with relatively high concentration of chlorine, which has relatively high controllability, and of relatively easily achieving low transmission loss with relatively low concentration of K, which has relatively low controllability, a preferable example of the average K concentration is equal to or lower than 100 atomic ppm, or equal to or lower than 60 atomic ppm. The average K concentration is preferable to be low as long as the effect of doping with K may be obtained, but its lower limit is, for example, 10 atomic ppm. Moreover, if it is 20 atomic ppm or higher, low transmission loss may be achieved while keeping the average concentration of chlorine relatively low.

The controllability of alkali metal elements including K will be more specifically explained. Alkali metal elements are dopants having high diffusion rates in glass, and are elements that prone to cause crystallization. Therefore, if low transmission loss is attempted to be achieved mainly through the control of alkali metal elements, variations in the diffusion tendencies of the elements may be large, and as a result, the transmission loss may vary.

Figure 5:
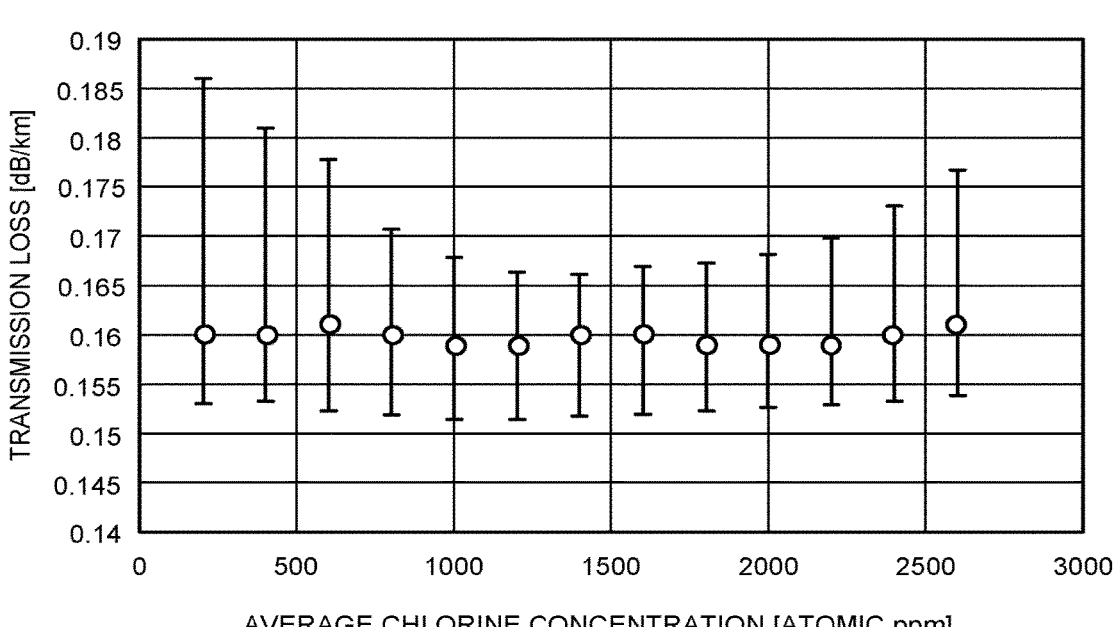
FIG. 5 is a diagram illustrating an example of a relationship between an average chlorine concentration and a transmission loss.

FIG. 5 is a diagram illustrating an example of a relationship between an average chlorine concentration and a transmission loss. The average K concentration was adjusted such that the transmission loss becomes approximately 0.16 dB/km according to the average chlorin concentration. Moreover, in FIG. 5, white circles are average values of transmission loss (average transmission loss) at average chlorine concentration thereof, and error bars represent variations thereof.

As can be seen from FIG. 5, when the average chlorine concentration is equal to or lower than 800 atomic ppm, the transmission loss often varied to the higher side, and there was a case in which the transmission loss becomes, for example, 0.185 dB/km or higher also. As described, it was found from numerous experimental verifications by the inventors of the present disclosure that the viscosity adjustment and the effect of reducing the fictive temperature by K are relatively unstable due to its difficulty in controlling diffusion, and when the control is not successful, there is a high possibility of increasing the transmission loss.

On the other hand, it is observed that variation of the transmission loss decreases when the average chlorine concentration is 800 atomic ppm or higher, and that particularly variation to the side higher than 0.16 dB/km decreases.

To reduce variation of the transmission loss to the higher side, it is preferable that the average chlorine concentration be equal to or lower than 2400 atomic ppm.

Next, average transmission losses when an effective core cross-sectional area (Aeff) is varied at the wavelength of 1550 nm in the respective refractive index profiles in FIG. 2 were studied. In this study, the average K concentration was set to approximately 50 atomic ppm, and the average chlorine concentration was set to approximately 1200 atomic ppm. The ratio of diameter (K-doped region/chlorine high-concentration region) was set to approximately 2.

The study results are shown in Table 2. As can be seen from Table 2, while the average transmission losses are low and preferable in either case of the step-index type, the W-shaped type, and the trench type, it was confirmed that the average transmission loss becomes relatively large if Aeff is larger than 160 μm². The reason is believed to be due to increase of influence of microbend loss on the transmission loss when Aeff becomes large. Furthermore, in the case of the segment-core type, because there are two regions in which the relative refractive-index difference becomes positive including the center core and the segment layer, the instability of field increases, and the control of matching the region in which the viscosity is reduced by chlorine and an alkali metal and the region having strong field strength becomes more difficult, to make it difficult to reduce the transmission loss. From the above, the optical fiber 1 is preferable to have the step-index type, the W-shaped type, or the trench type refractive index profile, and Aeff at the wavelength of 1550 nm is preferable to be equal to or smaller than 160 μm².

TABLE 2

| Aeff [μm²] | 80 | 90 | 100 | 110 | 120 | 130 | 140 | 150 | Unit: dB/km 160 | 170 |
|---|---|---|---|---|---|---|---|---|---|---|
| Step-Index Type | 0.160 | 0.158 | 0.157 | 0.156 | 0.156 | 0.158 | 0.162 | 0.167 | 0.177 | 0.199 |

TABLE 2-continued

| Aeff [μm²] | 80 | 90 | 100 | 110 | 120 | 130 | 140 | 150 | Unit: dB/km 160 | 170 |
|---|---|---|---|---|---|---|---|---|---|---|
| W-Shaped Type | 0.158 | 0.157 | 0.155 | 0.154 | 0.153 | 0.155 | 0.156 | 0.158 | 0.164 | 0.178 |
| Trench Type | 0.159 | 0.157 | 0.156 | 0.155 | 0.154 | 0.154 | 0.155 | 0.157 | 0.163 | 0.176 |
| Segment Core | 0.177 | 0.174 | 0.171 | 0.172 | 0.174 | 0.177 | 0.183 | 0.188 | 0.196 | 0.213 |

Moreover, the optical fiber 1 is preferable to propagate light of the wavelength of 1550 nm in single mode. Therefore, the cable cutoff wavelength is preferable to be equal to or shorter than 1550 nm, and is more preferable to be equal to or shorter than 1530 nm. On the other hand, it was found that the transmission loss at the wavelength of 1550 nm abruptly increases when the optical fiber 1 is designed to propagate light of the wavelength of 1550 nm in multimode.

Although a case of the alkali metal element being K has been mainly explained in the explanation of the above embodiment, the alkali metal element is not limited to K, but may be, for example, Na.

EXAMPLES

Samples of the optical fiber of an example were manufactured according to manufacturing methods 1, 2, and 3 below.

Manufacturing Method 1

In a publicly known vapor axial deposition (VAD) apparatus, silica soot was produced using silicon tetrachloride (SiCl₄) gas, hydrogen gas, oxygen gas, and inert gas. Thereafter, the silica soot was sintered to produce a silica glass preform. During sintering into glass, helium gas and chlorine gas were fed, to thereby dope chlorine at 800 atomic ppm or higher. Chlorine-based gas fed at the time of sintering into glass is not limited to chlorine gas, and may be, for example, silicon tetrachloride gas.

Thereafter, a hole is formed in a central portion of the produced silica glass preform by the hole drilling method as a chlorine injection tube. Subsequently, K was deposited on an inner surface of the chlorine injection tube. Deposition of K was performed by the aerosol method as described below. First, a potassium chloride (KCl) material is heated in an electric furnace to a temperature above its melting point and vaporized, and then formed into aerosol particles by a cooling gas, and was transported into the hole of the chlorine injection tube using argon carrier gas. Thus, K was deposited.

Thereafter, by performing collapse treatment by applying an oxyhydrogen flame to the surface of the chlorine injection tube under vacuum, and thereby the silica glass preformed doped with K in the central portion was obtained.

Although K is doped in the above method, the doping method is not limited thereto. For example, after silica soot is formed, provisional sintering may be performed at a temperature within a range not causing densification, and doping with K may be subsequently performed by an immersion method or the like. Moreover, although a chloride of K was used as a material containing K in the above method, it is not limited thereto, and other compounds, such as a nitrate, an iodide, and a bromide, may be used.

The optical fiber preform was obtained by performing jacketing process multiple times in which a jacket tube dope with F was attached to the silica glass preform obtained as described above and integrated therewith using an oxyhydrogen flame. During the jacketing process, stretching process of the silica glass preform by an oxyhydrogen flame was also performed appropriately. At that time, adjustment of the power of the oxyhydrogen flame was performed to diffuse K further toward the outside. At this time, a diffusion state of K in the optical fiber to be finally manufactured was checked each time, and optimization of heat treatment conditions was performed to make sure that a region doped with K was to be larger than a region doped with chlorine at 800 atomic ppm or higher in the optical fiber finally obtained. The optimization parameters herein include a flame power (oxyhydrogen feeding amount), a flame processing speed (flame burner sweep speed), the number of repeating flame processing, and the like. It was found that crystallization may be avoided with a significantly high probability by thus processing.

Thereafter, drawing of the completed optical fiber preform was performed to form the optical fibers. At this time, it was found that drawing conditions (drawing speed and drawing tension) also affect the transmission loss and, therefore, optimization of these was also performed. At this time, it was found that the characteristics of the optical fibers after drawing have also become stable by performing diffusion control of K (control of making the area doped with K larger than the area doped with chlorine at 800 atomic ppm or higher).

Manufacturing Method 2

Similarly to Manufacturing Method 1, a silica glass preform doped with chlorine at 800 atomic ppm was manufactured. Subsequently, K transported by the aerosol method as described above was fed into an oxyhydrogen burner together with an oxyhydrogen gas, and K was thereby deposited as uniformly as possible on an entire glass surface of the silica glass preform. Thereafter, similarly to Manufacturing Method 1, the jacketing process, the stretching process, and the like were performed, and optimization of the heat treatment conditions was also performed, and K was diffused inside and outside such that the region doped with K is to be larger than the region doped with chlorine at 800 atomic ppm or higher, to obtain an optical fiber preform. Thereafter, the completed optical fiber preform was drawn, to produce the optical fibers.

Manufacturing Method 3

Similarly to Manufacturing Method 1, a chlorine-doped tube in which chlorine is doped at 800 atomic ppm was manufactured. Subsequently, similarly to Manufacturing Methods 1, 2, K was deposited on an inner surface and on an outer surface of the chlorine-doped tube. Thereafter, similarly to Manufacturing Methods 1, 2, the jacketing process, the stretching process, and the like were performed, and optimization of the heat treatment conditions was also performed, and K was diffused inside and outside such that the region doped with K is to be larger than the region doped with chlorine at 800 atomic ppm or higher, to obtain an optical fiber preform. Thereafter, the completed optical fiber preform was drawn, to produce the optical fibers.

Figure 6:
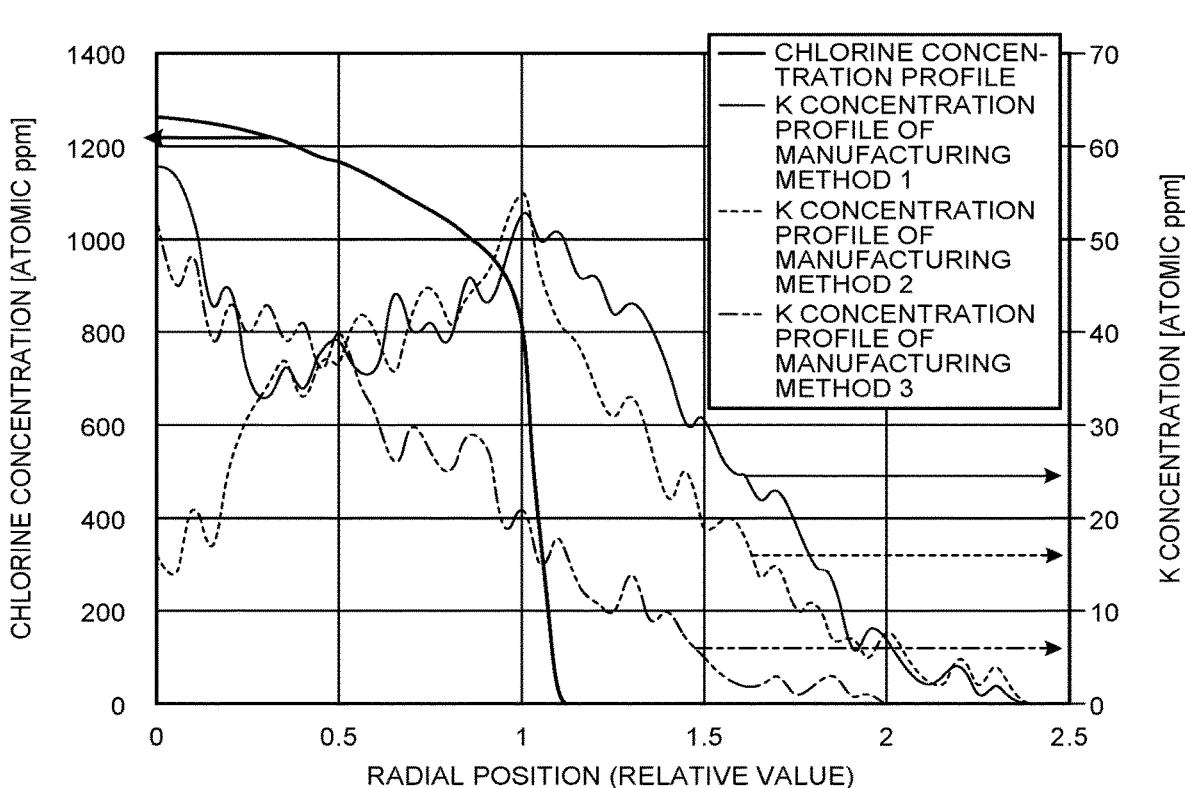
FIG. 6 is a diagram illustrating an example of a relationship among a radial direction position, a chlorine concentration, and a K concentration.

FIG. 6 is a diagram illustrating an example of a relationship among a radial position, a chlorine concentration, and a K concentration in the manufactured optical fiber. The the effective core cross-sectional area at the wavelength of 1550 nm was equal to or smaller than 160 $\mu m^2$, and it is considered that an influence of microbend loss was small.

Furthermore, it was confirmed that in either of samples No. 1 to No. 14, the region doped with K was larger than the region doped with chlorine at 800 atomic ppm. Specifically, in either of samples No. 1 to No. 14, the diameter of the region doped with K was 1.2 to 4.0 times the diameter of the region doped with chlorine at 800 atomic ppm or higher. The region doped with K is a region in which K is contained at a concentration of 0.1 atomic ppm or higher.

TABLE 3

| | | | | | | | | | Concentration Chlorine (Average)/K (Average) [Atomic ppm]/ |
|---|---|---|---|---|---|---|---|---|---|
| | | | | | | | | Manufacturing Method | |
| Sample No. | Δ1 [%] | Δ2 [%] | Δ3 [%] | Δclad [%] | b/a — | c/a — | 2a [μm] | — | [Atomic ppm] |
| No. 1 | 0.11 | — | — | −0.27 | — | — | 9.0 | 2 | 1,800/35 |
| No. 2 | 0.05 | — | — | −0.22 | — | — | 11.0 | 3 | 850/90 |
| No. 3 | 0.12 | — | — | −0.15 | — | — | 12.0 | 2 | 2,000/30 |
| No. 4 | 0.17 | −0.60 | — | −0.20 | 2.0 | — | 9.0 | 1 | 2,900/25 |
| No. 5 | 0.06 | −0.70 | — | −0.30 | 1.2 | — | 9.0 | 3 | 900/80 |
| No. 6 | 0.07 | −0.43 | — | −0.20 | 3.0 | — | 11.5 | 3 | 1,200/65 |
| No. 7 | 0.08 | −0.30 | — | −0.19 | 4.0 | — | 12.5 | 3 | 1,400/50 |
| No. 8 | 0.09 | −0.24 | — | −0.16 | 4.0 | — | 13.0 | 2 | 1,500/45 |
| No. 9 | 0.10 | −0.26 | — | −0.16 | 2.0 | — | 14.0 | 2 | 1,600/40 |
| No. 10 | 0.11 | −0.25 | −0.65 | −0.25 | 1.5 | 2.0 | 8.0 | 1 | 1,700/35 |
| No. 11 | 0.12 | −0.24 | −0.64 | −0.24 | 2.0 | 2.5 | 9.0 | 2 | 1,900/35 |
| No. 12 | 0.06 | −0.41 | −0.51 | −0.21 | 2.0 | 2.4 | 13.0 | 3 | 1,000/70 |
| No. 13 | 0.13 | −0.14 | −0.25 | −0.14 | 2.5 | 3.5 | 12.1 | 1 | 2,100/30 |
| No. 14 | 0.14 | −0.11 | −0.28 | −0.11 | 2 | 3 | 12.5 | 2 | 2,200/25 | radial position is obtained by normalizing a radial position from the center with a position at which the chlorine concentration is 800 atomic ppm.

The chlorine concentration profile in FIG. 6 is one obtained by Manufacturing Method 1, but substantially the same chlorine concentration profile was obtained also by Manufacturing Methods 2 and 3, and high reproducibility was confirmed. As for the K concentration, although concentration profiles differ according to the manufacturing method, it was possible to make the region doped with K larger than the region doped with chlorine at 800 atomic ppm or higher in either case. According to Manufacturing Methods 2, 3, at least one of peaks of K concentration is positioned at a position different from a peak of concentration of chlorine and, therefore, it is preferable from the viewpoint of suppression of crystallization and reduction of transmission loss.

Structural parameters of samples No. 1 to No. 14 manufactured by Manufacturing Methods 1 to 3 described above, the manufacturing methods, and concentrations of dopants are shown in FIG. 3. As for the refractive index profiles, Nos. 1 to 3 are the step-index type, Nos. 4 to 9 are the W-shaped type, and Nos. 10 to 14 are the trench type.

Moreover, optical characteristics of the respective samples are shown in Table 4. As shown in Table 4, in either one of samples Nos. 1 to 14, λcc is equal to or shorter than 1530 nm, and light of the wavelength 1550 nm may be propagated in single mode. Furthermore, the transmission loss at the wavelength of 1550 nm is equal to or lower than 0.185 dB/m, and there was low transmission loss. Moreover,

TABLE 4

| | Transmission Loss @1550 nm | λcc | Aeff @1550 nm |
|---|---|---|---|
| | Unit | | |
| Sample No. | [dB/km] | [nm] | [μm²] |
| No. 1 | 0.157 | 1254 | 80 |
| No. 2 | 0.159 | 1331 | 112 |
| No. 3 | 0.160 | 1396 | 126 |
| No. 4 | 0.164 | 1089 | 58 |
| No. 5 | 0.162 | 1115 | 70 |
| No. 6 | 0.158 | 1313 | 91 |
| No. 7 | 0.153 | 1492 | 113 |
| No. 8 | 0.152 | 1468 | 125 |
| No. 9 | 0.154 | 1498 | 132 |
| No. 10 | 0.157 | 1094 | 65 |
| No. 11 | 0.155 | 1275 | 79 |
| No. 12 | 0.156 | 1403 | 109 |
| No. 13 | 0.154 | 1478 | 125 |
| No. 14 | 0.157 | 1519 | 128 |

As described above, it was confirmed that the low transmission loss characteristics are achieved stably by the effect of high-concentration chlorine doping and the effect of K doping. Because the diffusion/distribution control of chlorine is easy compared to the diffusion control of K, the method used this study in which the viscosity of glass in the core portion is adjusted to some extent by high concentration chlorine, and an alkali metal element of an amount enabling easy control is used was confirmed to be significantly effective. Moreover, the method in which chlorine is added and also F is added for viscosity adjustment requires control of two kinds of gasses in the sintering process and the like, and the control is difficult. On the other hand, it was also confirmed that if it is only chlorine as in the manufacturing method in the example, relatively stable concentration distribution control is possible. Moreover, because characteristics are controlled mainly with chlorine that has been commonly used, no particular issues arose also in experiments of related techniques, such as cabling and connection performed thereafter. Therefore, it was confirmed from the example also that the present disclosure is a preferable method in terms of both preferable characteristics and stable manufacturability.

The present disclosure may be applied to optical fibers.

According to the present disclosure, an optical fiber in which transmission losses are reduced simply and effectively while the yield is improved may be realized.

The present disclosure is not limited to the embodiments described above. What is configured by appropriately combining the respective constituent elements described above is also included in the present disclosure. Moreover, more effects and modifications may be derived easily by those skilled in the art. Therefore, a wider aspect of the present disclosure is not to be limited to the embodiments described above, and various alterations may be applied.

What is claimed is:

1. An optical fiber comprising:
a core portion made of silica-based glass; and
a cladding portion made of silica-based glass having a maximum refractive index lower than the core portion, the cladding portion surrounding an outer periphery of the core portion, wherein the core portion is doped with an alkali metal element and chlorine,
an average concentration of the chlorine is higher than 900 atomic ppm and lower than 3000 atomic ppm on a cross-section of the core portion perpendicular to a longitudinal direction, and a region of the core portion doped with the alkali metal element is larger than a region of the core portion having a chlorine concentration of 800 atomic ppm or higher,
a ratio of a diameter of a substantially circular region doped with the alkali metal element to a diameter of a substantially circular region of the core portion having a chlorine concentration of 800 atomic ppm or higher is greater than 1.0,
the substantially circular region doped with the alkali metal element and the substantially circular region of the core portion having a chlorine concentration of 800 atomic ppm or higher are centered at a center of the core portion, and
an average concentration of the alkali metal element is equal to or higher than 10 atomic ppm and equal to or lower than 100 atomic ppm.

2. The optical fiber according to claim 1, wherein a region in the cladding portion adjacent to the core portion is doped with a refractive-index reducing dopant that reduces a refractive index of the silica-based glass.

3. The optical fiber according to claim 2, wherein the refractive-index reducing dopant is any one of fluorine and fluorine compound.

4. The optical fiber according to claim 1, wherein the alkali metal element is potassium.

5. The optical fiber according to claim 1, wherein the average concentration of the chlorine is 1000 atomic ppm or higher.

6. The optical fiber according to claim 1, wherein the average concentration of the alkali metal element is equal to or lower than 60 atomic ppm.

7. The optical fiber according to claim 1, wherein at least one of peaks of concentration of the alkali metal element is positioned at a position different from a peak of concentration of the chlorine.

8. The optical fiber according to claim 7, wherein the peak of the chlorine is positioned at a center of the core portion or at a vicinity of the center.

9. The optical fiber according to claim 1, wherein the optical fiber has a step-index type refractive index profile.

10. The optical fiber according to claim 1, wherein the optical fiber has a W-shaped refractive index profile.

11. The optical fiber according to claim 1, wherein the optical fiber has a trench type refractive index profile.

12. The optical fiber according to claim 1, wherein a transmission loss at a wavelength of 1550 nm is equal to or lower than 0.185 dB/m.

13. The optical fiber according to claim 1, wherein light of a wavelength of 1550 nm is propagated in single mode, and an effective core cross-sectional area at a wavelength of 1550 nm is equal to or smaller than 160 $\mu m^2$.

14. The optical fiber according to claim 2, wherein the average concentration of the chlorine is 1000 atomic ppm or higher.

15. The optical fiber according to claim 3, wherein the average concentration of the chlorine is 1000 atomic ppm or higher.

16. The optical fiber according to claim 4, wherein the average concentration of the chlorine is 1000 atomic ppm or higher.

17. The optical fiber according to claim 1, wherein:
the substantially circular region in which the alkali metal element is present at a concentration of 0.1 atomic ppm or higher has a first diameter, and
the substantially circular region having a chlorine concentration of 800 atomic ppm or higher has a second diameter, and a ratio of the first diameter to the second diameter is equal to or greater than 1.2.

* * * * *